United States Patent [19]

Rao

[11] 4,264,690

[45] Apr. 28, 1981

[54] GRID FOR A LITHIUM ELECTRODE IN A LITHIUM ORGANIC ELECTROLYTE CELL CONTAINING DIOXOLANE

[75] Inventor: Bhaskara M. L. Rao, Fanwood, N.J.

[73] Assignee: Exxon Research and Engineering Company, Florham Park, N.J.

[21] Appl. No.: 121,112

[22] Filed: Feb. 13, 1980

[51] Int. Cl.³ .............................................. H01M 6/16
[52] U.S. Cl. .................................. 429/194; 429/197; 429/245
[58] Field of Search ............... 429/194, 195, 197, 219, 429/245

[56] References Cited

U.S. PATENT DOCUMENTS

| | | | |
|---|---|---|---|
| 4,086,403 | 4/1978 | Whittingham et al. | 429/194 |
| 4,113,929 | 9/1978 | Margalit | 429/194 |
| 4,201,839 | 5/1980 | Johnson et al. | 429/197 |

*Primary Examiner*—Donald L. Walton
*Attorney, Agent, or Firm*—Robert S. Salzman

[57] ABSTRACT

A grid consisting of an electronically conducting base material coated with a metal which can alloy with lithium is used in a lithium organic electrolyte cell containing dioxolane as at least one component of the electrolyte. The alloy will retard a reaction between the dioxolane and the grid base material in order to minimize the decomposition of the dioxolane within the cell.

9 Claims, 1 Drawing Figure

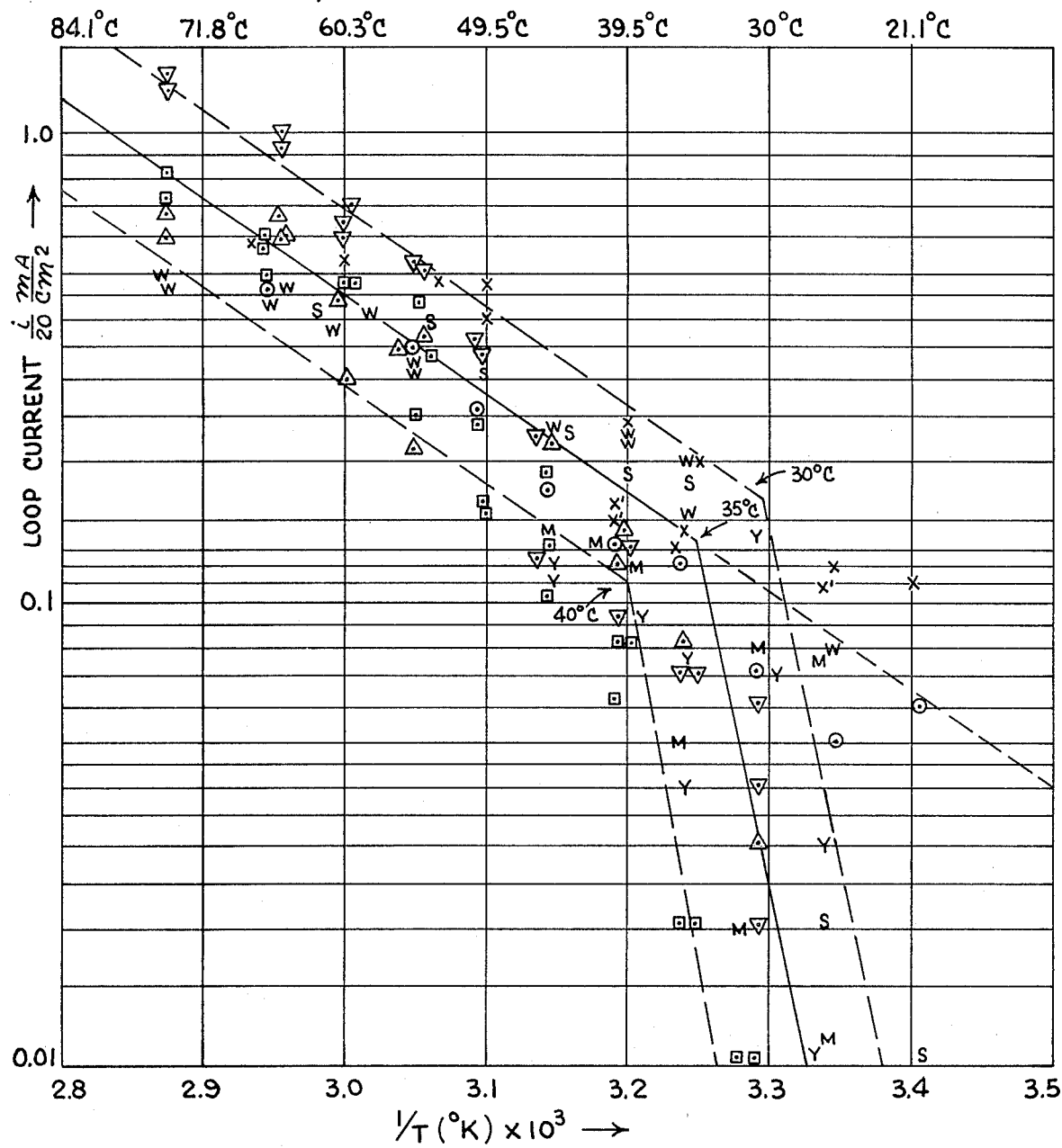

GRID FOR A LITHIUM ELECTRODE IN A LITHIUM ORGANIC ELECTROLYTE CELL CONTAINING DIOXOLANE

FIELD OF THE INVENTION

This invention pertains to lithium organic electrolyte cells and, more particularly, to an improved grid for a lithium electrode in a lithium organic electrolyte cell containing at least dioxolane.

BACKGROUND OF THE INVENTION

In the design of lithium organic electrolyte cells, it is normally expected that any chemically inert electronically conducting material can be used as a lithium anode substrate. This is so, because of the cathodic protection resulting from the high negative potential of the lithium anode. Thus, it is a usual practice to use a mild steel, stainless steel, copper or nickel material for the lithium electrode substrate.

In actual practice, however, catalytic reduction reactions involving the electrolyte may occur at the exposed substrate surface. While the high negative potential of the lithium will protect the metal substrate from dissolving due to corrosion, the electrolyte cannot be protected by this potential from reacting at the surface of the substrate polarized to a high negative potential by the lithium. Therefore, the use of lithium electrode substrates consisting solely of a base metal of steel, copper or nickel cannot be used. This problem is particularly acute with dioxolane-based electrolytes employed in $Li/TiS_2$ cells.

The invention seeks to provide a solution to the above-mentioned problem by rendering the substrate material inactive or noncatalytic with respect to the dioxolane-containing electrolyte.

DISCUSSION OF THE PRIOR ART

In the battery arts, it is well known to have electrodes and grid structures featuring composites of various metallic elements. For example, the U.S. patent to: P. O. Hagarman, entitled: "SILVER-ZINC OR CADMIUM TYPE BATTERY WITH WIRE MESH SCREEN ELECTRODE"; U.S. Pat. No. 3,447,967; issued: June 3, 1969, discloses an electrode having an inner core of nickel covered by an outer layer of silver. The use of this construction is not for the purpose of preventing detrimental ancillary reactions within the battery cell, but rather to reduce the cost of expensive solid silver electrodes.

In the U.S. patent to: G. W. Mao, entitled: "BATTERY ELECTRODE GRIDS MADE FROM TIN-LITHIUM-LEAD ALLOY"; U.S. Pat. No. 3,647,545; issued: Mar. 7, 1972, an alloy of tin-lithium-lead is described for a lead acid battery system. Tin has been added to the existing lead-lithium alloy to prevent oxidation of the electrode at the grain boundaries. The use of this further alloying metal was not meant as a means of preventing electrolyte decomposition as is the case in the subject invention.

In the U.S. patent to S. Ruben, entitled: "LEAD-SULFURIC ACID STORAGE BATTERY AND GRID THEREFOR"; U.S. Pat. No. 4,140,840; issued: Feb. 20, 1979, a grid is described having a base of iron, nickel or an alloy thereof, a coating of tin-nickel alloy and a layer of lead thereover. The use of this composite is to provide a reduction in weight of the grids, as well as to reduce their porosity.

A high energy density electrochemical cell is disclosed in the U.S. patent to: M. S. Whittingham, entitled: "ALKALI METAL/NIOBIUM TRISELENIDE CELL HAVING A DIOXOLANE-BASED ELECTROLYTE"; U.S. Pat. No. 4,086,403; issued: Apr. 5, 1978. This cell has dioxolane in the electrolyte and has anodes of alkali metal including lithium, and alloys thereof. This patent does not recognize the problem of the dioxolane reacting with the anode, with its subsequent decomposition. Consequently, the use of coatings which will alloy with the lithium in the electrolyte are not contemplated.

BRIEF SUMMARY OF THE INVENTION

The invention relates to an improved grid for a lithium electrode utilized in a cell containing a lithium organic electrolyte consisting of at least dioxolane as one of the components thereof. The grid consists of an electronically conducting base material coated with a metal which can alloy with lithium. The alloy which is formed when the electrolyte contacts the grid, will retard the reaction between the dioxolane and the grid base material. This will, therefore, minimize or substantially prevent the dioxolane from decomposing within the cell.

Metals which will generally alloy with lithium are: zinc, tin, silver, lead and cadmium, etc.

The base material for the grid can be any electronically conducting material, such as carbon, a metal, or other metallic or semimetallic substance.

It is an object of this invention to provide an improved grid for a lithium electrode in a cell containing a lithium organic electrolyte.

It is another object of the invention to provide a grid for a lithium electrode in a cell having a lithium organic electrolyte containing dioxolane, which grid does not react with the dioxolane to cause its decomposition.

These and other objects of this invention will be better understood and will become more apparent with reference to the following detailed description taken in conjunction with the accompanying drawing.

BRIEF DESCRIPTION OF THE DRAWING

The FIGURE is a graphical representation in the form of Arrhenius curves of electrolyte activity using standard grid and electrolyte materials.

DETAILED DESCRIPTION OF THE INVENTION

Generally speaking, the invention features a current collector grid consisting of an electronically conducting base material coated with a metal which can alloy with lithium. The grid is used for a lithium electrode in a cell containing a lithium organic electrolyte having dioxolane as at least one component thereof. The grid will retard or substantially eliminate the reaction between the dioxolane and the base material, thus minimizing the decomposition of the dioxolane within the cell.

The existence of a reaction between the dioxolane of the electrolyte and the grid base material, usually a metal such as iron, copper, nickel or alloys thereof, is demonstrated by the presence of a loop current between lithium and the grid material polarized to lithium potential in a lithium grid cell circuit. A number of lithium grid cells were constructed using a 0.02" thick lithium foil of 1"×1" area. The lithium foil served as one of the electrodes of the cells, and was unsupported on any grid. The second electrode of the cells, which served as the positive terminal, comprised a 1"×1" expanded metal grid. Four of the cells used a copper grid, and three used a 304 stainless steel.

The electrodes of each cell were sandwiched about a porous fiber glass mat and immersed in a polyethylene bag that served as the container of the cell.

Approximately 2–5 ml of either Li$\phi_4$B (lithium tetraphenyl borate); LiBr; or LiSCN in a solvent containing dioxolane was used in these cells as electrolyte. Each cell had suitable connections for completing a circuit.

The cells were initially kept for a brief time (approx. 8 hrs.) in a shorted state, to reduce surface impurities (shorted across the electrodes).

Current in the shorted loop was then measured as a function of temperature. A graph of the loop current versus the temperature is illustrated in the attached FIGURE. This FIGURE depicts a number of Arrhenius curves for the various cells. The short circuit current is most probably due to the reaction of dioxolane with the grid material.

From this FIGURE, it is evident that the grid electrode reaction was independent of the solute and the base material of the grid.

The curves of this FIGURE also suggest that the reaction is accelerated at temperatures above or at 35°±5° C. There is a change in activation energy from approximately 55 KCal/mole to approximately 10 KCal/mole above the critical temperature of 35°±5° C. From this evidence, it would be expected that high temperature storage conditions would detrimentally affect these cells. The cells could be directly or indirectly impaired by: (a) consumption of the cell reaction (lithium supported reaction) at the lithium electrode; (b) formation of films on lithium due to products of reaction at the grid electrode; (c) evolution of gases at the grid electrode which may cause a buildup of pressure in the cell, and eventually lead to cell rupture; and (d) exhaustion of solvent from the cell causing it to dry up, due to the reaction at the grid.

The need to suppress the loop current producing reaction is, therefore, most desirable, and is one of the objects of the present invention.

It has been discovered that the dioxolane reaction at the grid electrode surface may be retarded or substantially eliminated by coating the surface of the grid electrode with a metal which will alloy with lithium. Metals which alloy with lithium are, amongst others: zinc, tin, silver, lead and cadmium, etc. Such a coating can be thin, and can be applied by electroplating, electroless plating, and vacuum deposition processes. The coating of the metal may even be applied via a hot dip process, as is common in tinning and galvanizing.

The coated grids, when used in the above-mentioned cells, were found to reduce the loop current approximately fifty-fold at 65° C. This was evidenced by the drop in loop currents from 40–50 $\mu$A/cm$^2$ for Li/steel and Li/Cu cells, to loop currents of less than 1 $\mu$A/cm$^2$ for Li/zinc coated mild steel and Li/silver coated copper cells. These measurements were made 15 days after alloying the grid base material and shorting the circuit between the electrodes. The measurements were carried out at room temperature with the following electrolytes: 0.6 MLi$\phi_4$B: 1,3 dioxolane; 3MLiSCN: 1,3 dioxolane; and 2MLiBr: 1,3 dioxolane.

It is theorized that the reduction of the loop currents corresponding to the decomposition of the dioxolane results from the inactivation of the grid surface by means of the thin protective layer. The grid surface may also become noncatalytic to solvent reaction as a result of the coating.

The surface of the grid will instantly alloy upon contact with the lithium-based electrolyte.

The grids of the present invention are meant to be employed in a wide range of lithium cells, but are particularly applicable to cells having a Li/TiS$_2$ couple.

Other lithium-based electrolytes than aforementioned can also be used, and are also compatible with respect to the inventive grids. Such electrolytes may comprise salts such as LiA$_s$F$_6$; LiPF$_6$; LiBF$_4$; LiSbF$_6$; etc. in a solvent or solvent mixture of dioxolane or dioxolane: dimethoxyethane, respectively.

Having thus described the invention, what is desired to be protected by Letters Patent is presented by the following appended claims.

What is claimed is:

1. A lithium organic electrolyte cell, comprising: dioxolane as at least one component of said electrolyte, and a current collector grid for a lithium electrode of said cell consisting of an electronically conducting base material coated with a metal that can form an alloy with lithium, wherein said alloy can retard reaction between said dioxolane and said grid base material in order to minimize the decomposition of said dioxolane within said cell.

2. The lithium organic electrolyte cell of claim 1, wherein said lithium organic electrolyte cell comprises a Li/TiS$_2$ couple.

3. The current collector grid of said lithium organic electrolyte cell of claim 1, wherein said electronically conducting base material comprises a metal.

4. The current collector grid of said lithium organic electrolyte cell of claim 1, wherein said electronically conducting base material is selected from a group of materials consisting of: copper, iron, nickel and alloys thereof.

5. The current collector grid of said lithium organic electrolyte cell of claim 1, wherein said metal coating is selected from a group of materials consisting of: zinc, tin, silver, lead and cadmium.

6. The current collector grid of said lithium organic electrolyte cell of claim 4, wherein said metal coating is selected from a group of materials consisting of: zinc, tin, silver, lead and cadmium.

7. The lithium organic electrolyte cell of claim 1, wherein a conducting solute component of said electrolyte comprises a lithium salt.

8. The lithium organic electrolyte cell of claim 1, wherein said dioxolane is a cosolvent with dimethoxyethane in said electrolyte.

9. The lithium organic electrolyte cell of claim 1, wherein said electrolyte consists of a solute in a dioxolane-containing solvent selected from the group: Li$\phi_4$B; LiBr; LiSCN; LiA$_s$F$_6$; LiPF$_6$; LiBF$_4$; and LiSbF$_6$.

* * * * *